US009818397B2

(12) United States Patent
Goo (10) Patent No.: US 9,818,397 B2
(45) Date of Patent: Nov. 14, 2017

(54) METHOD AND SYSTEM FOR TRANSLATING SPEECH

(71) Applicant: Motorola Mobility LLC, Libertyville, IL (US)

(72) Inventor: Kah Jon Goo, Carpentersville, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 224 days.

(21) Appl. No.: 14/048,091

(22) Filed: Oct. 8, 2013

(65) Prior Publication Data

US 2015/0058023 A1    Feb. 26, 2015

Related U.S. Application Data

(60) Provisional application No. 61/870,206, filed on Aug. 26, 2013.

(51) Int. Cl.
*G06F 17/28*    (2006.01)
*G10L 15/00*    (2013.01)

(52) U.S. Cl.
CPC .......... *G10L 15/005* (2013.01); *G06F 17/289* (2013.01)

(58) Field of Classification Search
CPC .... G06F 17/27; G06F 17/2735; G06F 17/275; G06F 17/2765; G06F 17/2785; G06F 17/28; G06F 17/2809; G06F 17/2854; G06F 17/2872; G06F 17/2881; G06F 17/289
USPC ................................. 704/277, 2, 3, 5, 7, 10
See application file for complete search history.

(56) References Cited

U.S. PATENT DOCUMENTS

| 2008/0221862 | A1* | 9/2008 | Guo et al. ......................... 704/2 |
| 2008/0253583 | A1* | 10/2008 | Goldstein et al. ............... 381/92 |
| 2010/0185432 | A1 | 7/2010 | Almagro |
| 2010/0250231 | A1* | 9/2010 | Almagro .......................... 704/2 |
| 2011/0238407 | A1* | 9/2011 | Kent ................................. 704/3 |
| 2013/0289971 | A1* | 10/2013 | Parkinson et al. ................ 704/2 |

FOREIGN PATENT DOCUMENTS

| EP | 1928189 A1 | 6/2008 |
| WO | 03052624 A1 | 6/2003 |

OTHER PUBLICATIONS

Jeff Richardson, "Review: Google Translate for iPhone—You Speak One Language, the App Speaks it Back in Another Language", Feb. 9, 2011, 7 pages.

\* cited by examiner

*Primary Examiner* — Qi Han
(74) *Attorney, Agent, or Firm* — RMCK Law Group, PLC (57) ABSTRACT

An electronic communication device (104) receives a first set of digital audio signals via radio frequency signaling, translates the first set of digital audio signals from speech of a first language (e.g. English) into translated speech of a second language (e.g., French), and emits the translated speech of the second language via a loudspeaker (226). The electronic communication device (104) also receives a second set of digital audio signals, which it translates from speech of the second language into translated speech of the first language. The electronic communication device (104) transmits, via radio frequency signaling, a third set of digital audio signals. The third set of digital audio signals represents the translated speech of the first language.

20 Claims, 8 Drawing Sheets

METHOD AND SYSTEM FOR TRANSLATING SPEECH

TECHNICAL FIELD

The present disclosure relates generally to speech translation devices.

BACKGROUND

Many of the hardships involved in international travel, including crowded airports, cramped seating, and tightly-packed schedules, are common to all long-distance trips. The international traveler, however, faces the additional challenge of a language barrier. Not being able to speak or understand the local language makes even the most basic activities, such as ordering food, awkward if not impossible. The ideal solution, which is to hire a local interpreter, is cost prohibitive for most people.

Technology-based solutions have been on the market for some time. One of the most common tools is an electronic dictionary. The more advanced models receive typed or spoken phrases in the user's language, translate the phrases into a second language, and display the translated phrases onto a screen or play them through an audio speaker. When traveling to multiple countries in one trip, the user needs to change the settings on the dictionary so that it uses the correct target language.

Smartphones can now perform the tasks previously performed by standalone electronic dictionaries. Launching a smartphone app in a timely manner can sometimes be difficult, though. The user needs to pull out the device, set the target language, and execute the app.

DRAWINGS

While the appended claims set forth the features of the present techniques with particularity, these techniques may be best understood from the following detailed description taken in conjunction with the accompanying drawings of which:

DETAILED DESCRIPTION

The following description is based on embodiments of the claims and should not be taken as limiting the claims with regard to alternative embodiments that are not explicitly described herein.

An electronic communication device with at least a loudspeaker, such as a smartphone or laptop, has a local area connection to an accessory that includes a microphone and loudspeaker. For example, the accessory could be a Bluetooth® headset. Using the electronic communication device, the accessory, and a speech translation software application on the electronic communication device, two users speaking different languages can each be translated into the appropriate target language for the other user to understand.

According to various embodiments of the disclosure, the first user is assumed to be an owner of both the electronic communication device and the locally-connected accessory. Thus, a first user could be wearing a Bluetooth® headset that is wirelessly communicating with the electronic communication device. The second user is assumed to be someone who speaks a language different from the first user. For example, the first user might speak English while the second user speaks German.

When the first user speaks, the microphone of the accessory picks up the audio speech and transmits, via radio frequency signaling, digital audio signals representing that speech to the electronic communication device. The electronic communication device receives the digital audio signals and translates the speech represented therein from English (e.g., a first language for the first user) into German (e.g., a second language for the second user). The electronic communication device may select the first and second languages for the translation based on default values, user-selected values, location-based values, or a combination thereof. In one example, the first user (e.g., as the owner of the electronic communication device) may set a default value for the first language to English. The first user or the second user may select the first or second language, for example, through a visual or audio prompt by the electronic communication device. In another example, the electronic communication device may automatically determine the first or second language based on a current geographic location of the electronic communication device. In this case, the electronic communication device may automatically select German for the second language if the current geographic location corresponds to a location or geographic area where German is commonly spoken.

After translation, a loudspeaker of the electronic communication device emits the translated speech (e.g., in German) for the second user to hear. The second user may then speak to the first user using his or her native language, German in this case. The second user speaks and the electronic communication device receives digital audio signals representing audio speech from the second user. The electronic communication device may receive the digital audio signals from the microphone of the accessory or from a microphone of the electronic communication device. The electronic communication device translates the digital audio signals from German to English for the first user to hear. The electronic communication device transmits digital audio signals representing the translated speech (e.g., in English) to the accessory. The accessory then emits the digital audio signal for the first user to hear via another loudspeaker, for example, an earpiece speaker of the accessory.

The first and second users may continue to speak to each other using translated speech provided by the electronic communication device. While the first user has been assumed to be the owner of the electronic communication device and the accessory in the described example, in other examples the accessory may belong to another person. In this case, the first or second user may manually set the first or second language. In another example, speech from the second user is instead provided by a voice-activated device, such as a voice-activated information kiosk. In this case, emission of the translated speech in the first language to the first user via the accessory (e.g., via the earpiece) reduces the likelihood of the voice-activated device attempting to process the translation of its own speech.

The term "geographic location" (also referred to as "location") as used herein means a location or geographic area on the Earth. A geographic location is typically expressed in terms of a coordinate system, such as latitude and longitude. However as described herein, the geographic location may include a geographic area. The geographic area in this case represents an area or region with a commonly spoken language, dialect, accent, or combination thereof. For example, one geographic area may include a country with a national or official language (e.g., the French language in France). Another geographic area may include several countries or portions thereof (e.g., the U.S.A. and portions of Canada) with a commonly spoken language (e.g., English). The geographic area may also indicate specific portions or regions of a country that speak different languages, such as French-speaking regions and German-speaking regions of Switzerland. In another example, the geographic area corresponds to a dialect of a language, for example, a Mexican Spanish dialect as opposed to a Spanish dialect spoken in Spain. Other geographic areas may provide smaller or more local divisions, for example, a state with a commonly spoken accent of a language (e.g., Texas with a "southern" accent of English), a city (e.g., French in Quebec), or a portion or neighborhood of a city. Other examples of geographic areas will be apparent to those skilled in the art. For simplicity, the description herein refers to first and second languages for translation, however the first language and second language may be first and second dialects of a same language, first and second accents of a same language, or other combinations of language, dialect, or accent, as will be appreciated by those skilled in the art.

Turning to the drawings, wherein like reference numerals refer to like elements, techniques of the present disclosure are illustrated as being implemented in a suitable environment.

Figure 1:
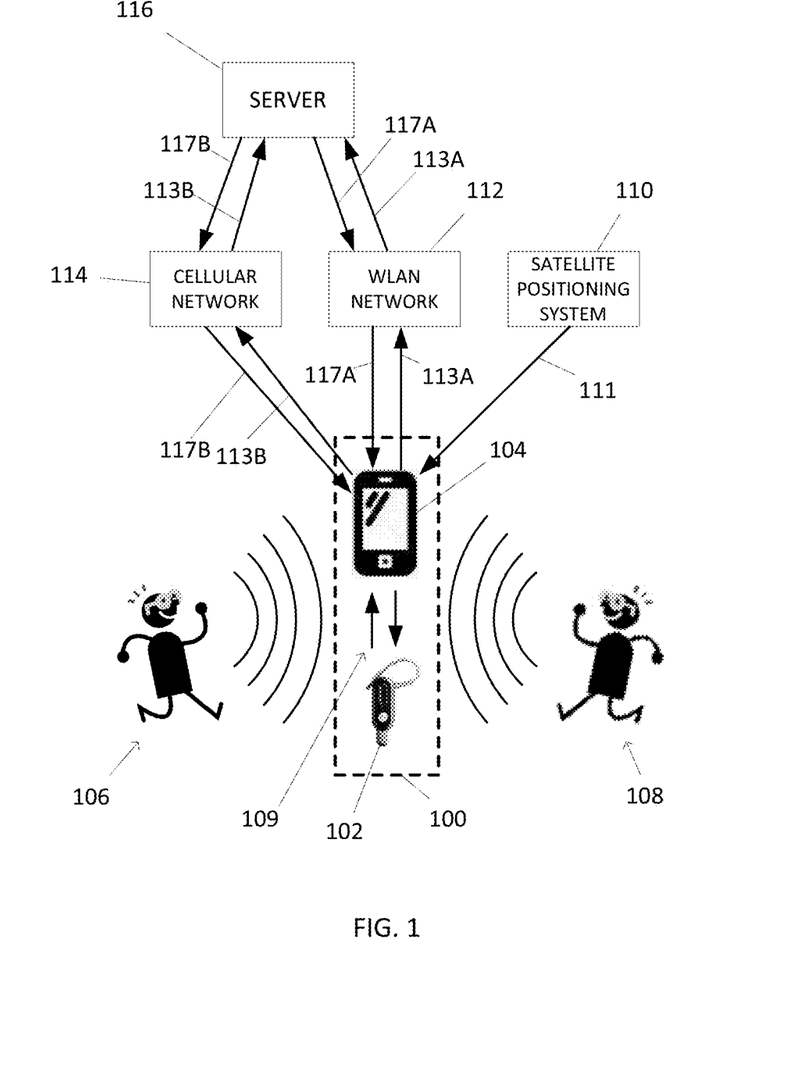
FIG. 1 is a simplified block diagram illustrating a translation system according to an embodiment of the disclosure.

FIG. 1 shows a simplified diagram that illustrates at a high level how a translation system 100 operates according to an embodiment of the disclosure. The translation system 100 includes a first electronic device 102 and a second electronic device 104. FIG. 1 also shows a first user 106 speaking and a second user 108 speaking. Possible implementations of the first electronic device 102 include a wireless headset or earpiece. Possible implementations of the second electronic device 102 include an electronic communication device, such as a smartphone, a tablet computer, or a personal computer. In some embodiments, each of electronic devices 102 and 104 is a full-functioning device such as a smartphone, a tablet computer, or a personal computer. The electronic devices 102 and 104 are configured to communicate with each other using radio frequency (RF) signaling 109. The format of the RF signaling in one example is compliant with a communication technology such as Bluetooth®, IEEE 802.11 (e.g., "WiFi"), IEEE 802.15, ZigBee, or other short range RF technologies suitable for wireless personal area networks.

According to an embodiment of the disclosure, the second electronic device 104 is communicatively linked to a satellite positioning system 110, such as the Global Positioning System (GPS), Globalnaya Navigatsionnaya Sputnikovaya Sistema (GLONASS), BeiDou Navigation Satellite System, Galileo Navigation system, or Indian Regional Navigational Satellite System. The second electronic device 104 receives satellite signals 111 from the satellite positioning system 110. The satellite signals 111 allow the second electronic device 104 to determine its location in terms of latitude and longitude. In other implementations, the second electronic device 104 is configured to receive satellite signals from a plurality of satellite positioning systems (e.g., both GPS and GLONASS) for determination of its geographic location.

The second electronic device 104 may also be communicatively linked to a wireless local area network (WLAN) 112 or cellular network 114. The WLAN 112 in one example is an IEEE 802.11 network. Examples of the cellular network 114 include a code division multiple access (CDMA) network, universal mobile telecommunications system (UMTS) network, long term evolution (LTE) network, or other cellular network. The second electronic device 104 transmits requests for information (e.g., along path 113A or 113B) to one or more servers 116 (referred to herein as "servers 116") via the WLAN 112 or cellular network 114. The servers 116 process the requests and send the requested information to the second electronic device 104 via the WLAN 112 or cellular network 114 (e.g., along path 117A or 117B). The servers 116 provide online translation services such as Google Translate™, and may further provide online location services, such as those provided by Google Maps™. It is to be understood that each function performed by the servers 116 may be carried out by a single server or by multiple servers. While separate paths (e.g., paths 113A, 113B, 117A, and 117B) are shown between the second electronic device 104 and the server 116, in alternative embodiments, the paths may overlap over a shared network, such as the Internet.

Figure 2:
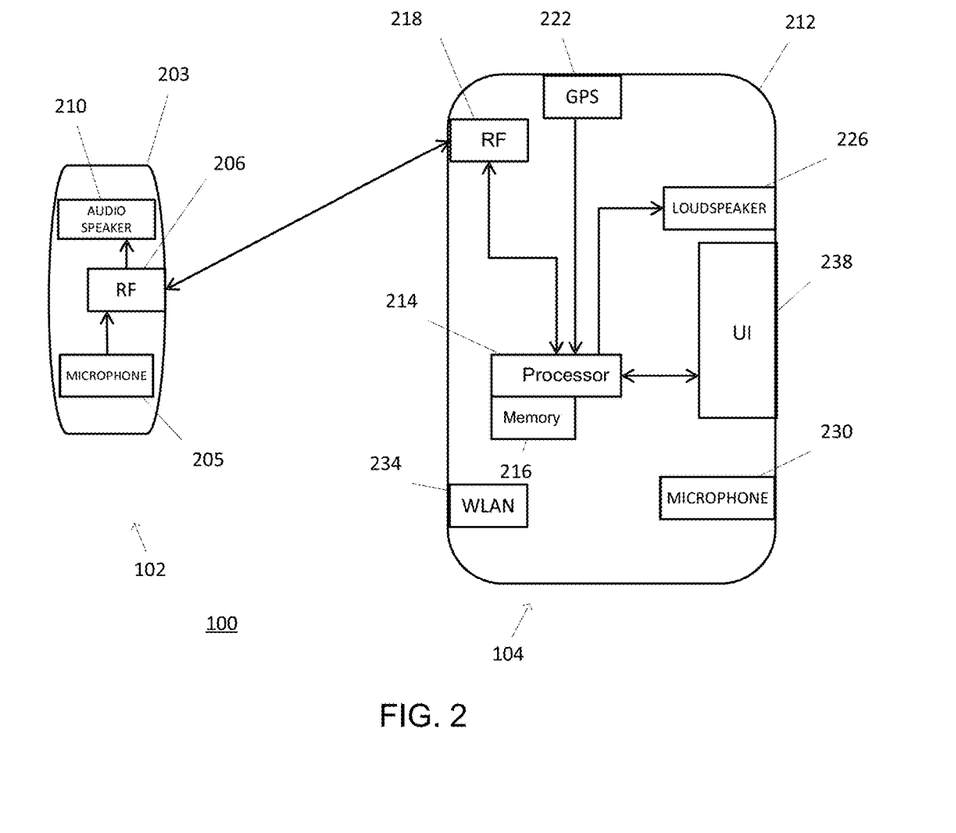
FIG. 2 is a simplified block diagram illustrating first and second electronic devices of the translation system of FIG. 1.

Turning to FIG. 2, an embodiment of the translation system 100 is shown. The first electronic device 102 has a housing 203. Within the housing 203, the first electronic device 102 includes a microphone 205 (also referred to herein as the "second microphone") and an RF module 206 electrically coupled to the microphone 205. The microphone 205 is configured to sense sound and converts the sensed sound into a set of digital audio signals. The first electronic device 102 also includes an audio speaker 210 electrically coupled to the RF module 206.

Referring to FIG. 2, the second electronic device 104 has a housing 212. Within the housing, the second electronic device 104 includes a processor 214 electrically coupled to a memory 216. The second electronic device 104 also includes: an RF module 218 electrically coupled to the processor 214; a satellite module for communication with the satellite positioning system 110, such as GPS module 222, electrically coupled to the processor 214; an audio loudspeaker 226 electrically coupled to the processor 214; a microphone 230 (also referred to herein as the "first microphone") electrically coupled to the processor 214; a WLAN module 234 electrically coupled to the processor 214; and a user interface (UI) 238 electrically coupled to the processor 214. The second electronic device 104 may turn the microphone 230 "on" or "off" for translation, as described herein.

Figure 3:
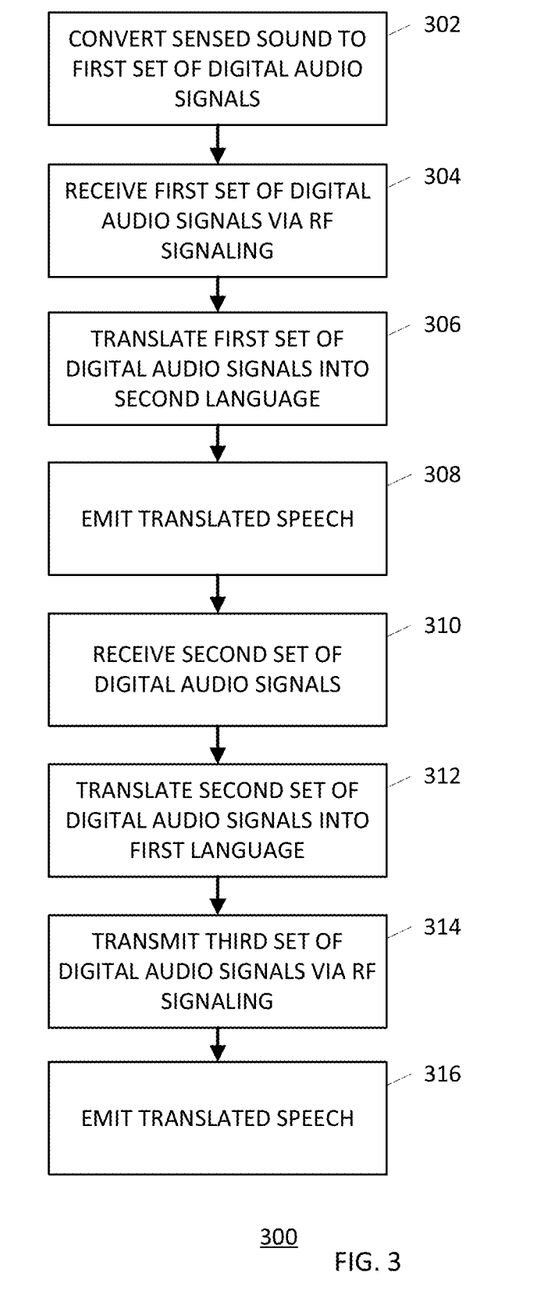
FIG. 3 is a flowchart of a procedure for translation with the translation system of FIGS. 1 and 2 according to an embodiment of the disclosure.

Turning to FIG. 3, a flowchart 300 illustrates a procedure for translation with the translation system 100 according to an embodiment. The first user 106 speaks into the microphone 205 (a first microphone). The microphone 205 converts (302) sensed sound from the speech of the first user 106 into a first set of digital audio signals. The RF module 206 transmits the first set of digital audio signals to the RF module 218 of the second electronic device 104. In other implementations, additional processing steps such as analog-to-digital conversion or voice processing may be performed by the microphone 205 or the RF module 206 prior to transmission to the RF module 218.

The second electronic device 104 receives (304) the first set of digital audio signals via the RF module 218. The second electronic device 104 translates (306) the first set of digital audio signals from speech of a first language into translated speech of a second language. Using the example described above, the second electronic device 104 translates speech in English from the first set of digital audio signals to translated speech in German. The second electronic device 104 emits (308) the translated speech via the loudspeaker 226 for the second user 108 to hear.

The second user 108 in one example responds to the translated speech emitted by the loudspeaker 226 by speaking in German. The speech of the second user 108 in one example is sensed by the microphone 205 of the first electronic device 102. In another example, the speech of the second user 108 is sensed by the microphone 230 of the second electronic device 104. The second electronic device 104 receives (310) a second set of digital audio signals, for example from the microphone 230 or from the microphone 205 (e.g., via the RF modules 206 and 218). The second electronic device 104 translates (312) the second set of digital audio signals from speech of the second language (e.g., German) into translated speech of the first language (e.g., English). The second electronic device 104 transmits (314) a third set of digital audio signals representing the translated speech of the first language to the first electronic device 102, via RF signaling with the RF modules 218 and 206. The first electronic device 102 then emits (316) the translated speech in the first language for the first user 106 to hear.

Figure 4:
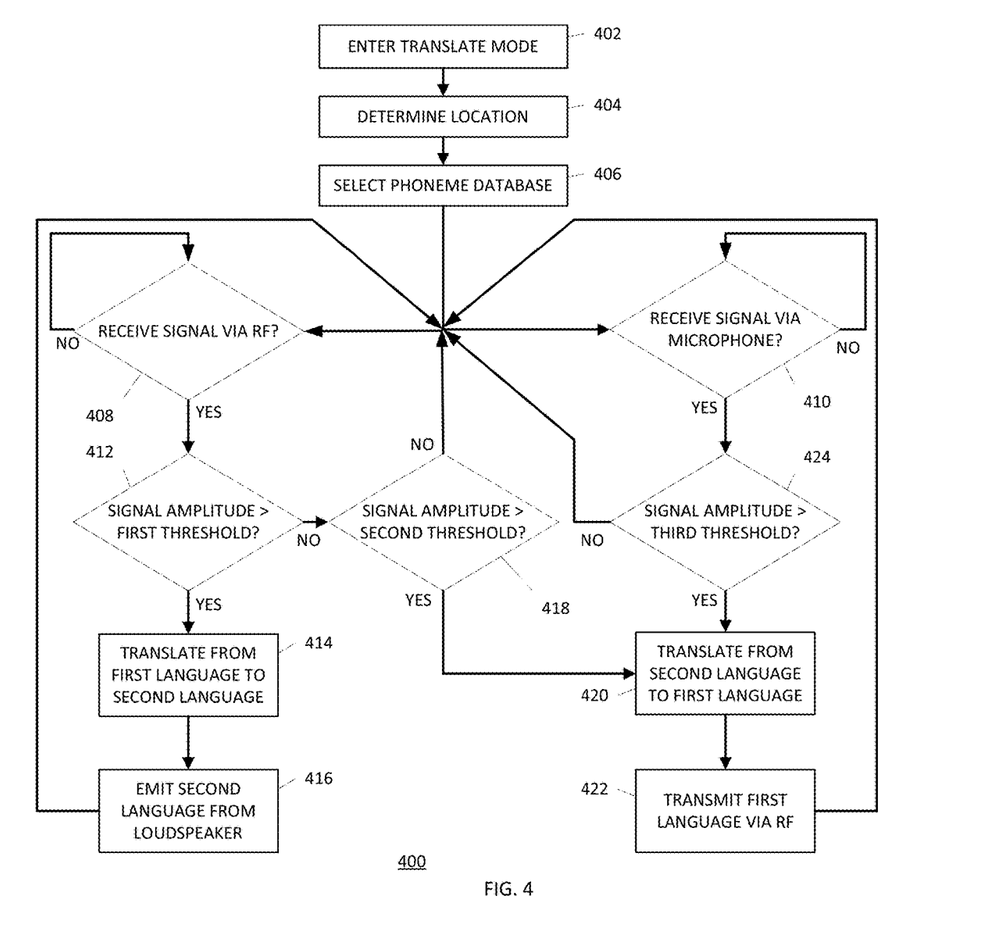
FIG. 4 is a flowchart of another procedure for translation with the translation system of FIGS. 1 and 2 according to an embodiment of the disclosure.

Turning to FIG. 4, a flowchart 400 illustrates another procedure for translation that may be performed by the translation system 100 according to an embodiment. The second electronic device 104 enters (402) a translate mode in response to a user input. In one example, the user input is a touch input, such as a press of an actual or virtual button on the first electronic device 102 or the second electronic device 104. In another example, the user input is a touch-gesture, such as a swipe or pattern on a touch-sensitive surface of the first electronic device 102 or the second electronic device 104. The user input may also be a voice input or command (e.g., "OK, translate this.") received through the microphone 205 or the microphone 230. Other types of user input, such as those through the UI 238 (FIG. 2) or other gestures (e.g., twisting or shaking as sensed by an accelerometer) will be apparent to those skilled in the art.

The second electronic device 104 optionally determines (404) its current geographic location or geographic area. The second electronic device 104 in one example receives latitude and longitude coordinates from the GPS module 222 (or another satellite module) and uses a lookup table to map the latitude and longitude to a geographic location or geographic area. In another example, the second electronic device 104 transmits a request to the servers 116 (FIG. 1) for geographic location information. The request contains a list of wireless access points that the WLAN module 234 (FIG. 2) detects. The servers 116 (FIG. 1) respond to this request by looking up the wireless access points of the list in a geographic location database, determining the geographic location based on the database look up, and transmitting a response containing geographic location data to the second electronic device 104. In yet another example, the second electronic device 104 uses a signal or message from the cellular network 114 that indicates or includes an identifier of a known base station, access point, or other network entity of the cellular network 114. In this case, the second electronic device 104 may use a lookup table that correlates a physical cell identifier (or other identifier) to a geographic location or geographic area.

The second electronic device 104 selects (406) a phoneme database for translation. The electronic device 104 selects the phoneme database (or a plurality of phoneme databases) based on the first and second languages for the translation. As described above, the electronic device 104 may select the first and second languages based on default values, user-selected values, location-based values (e.g., the geographic area determined in 404), or a combination thereof.

After selection of the phoneme database, the second electronic device 104 determines whether a set of digital audio signals has been received (408) via RF signals (e.g., from the first electronic device 102 via the RF modules 206 and 218) or received (410) via the microphone 330 (e.g., when the microphone 330 is active). If the set of digital audio signals is received via RF signals (YES at 408), the second electronic device 104 determines (412) whether a signal amplitude of the set of digital audio signals meets a first threshold. Due to close proximity of the first electronic device 102 (e.g., an earpiece or headset) to the first user 106 as compared to the second user 108, a set of digital audio signals corresponding to the first user 106 will likely have a higher amplitude (e.g., a louder voice) than a set of digital audio signals corresponding to the second user 108. Thus, the first threshold being met indicates that the set of digital audio signals correspond to speech from the first user 106 (thus in the first language) as opposed to the second user 108 or merely being a noise signal.

If the first threshold is met (YES at 412), the second electronic device 104 translates (414) the set of digital audio signals from speech of the first language to translated speech of the second language. In one example, the second electronic device 104 sends a message with the set of digital audio signals to the servers 116 for translation by an online translation service (e.g., using the Google Translate service). The message may further include an indication of the selected phoneme database. In another example, the second electronic device 104 performs the translation using the selected phoneme database (e.g., a database stored in the memory 216). The second electronic device 104 emits (416) the translated speech of the second language from the loudspeaker 226 for the second user 108 to hear. The second electronic device 104 then returns to determine (408, 410) whether another set of digital audio signals has been received.

If the first threshold is not met (NO at 412), the second electronic device 104 determines (418) whether the signal amplitude of the set of digital audio signals meets a second threshold. In contrast to the first threshold, the second threshold indicates whether the set of digital audio signals correspond to speech from the second user 108 (thus in the second language) as opposed to merely being a noise signal. If the second threshold is not met (NO at 418), the set of digital audio signals are likely to be a noise signal, thus the second electronic device 104 returns to determine (408, 410) whether another set of digital audio signals has been received. If the second threshold is met, the second electronic device 104 translates (420) the set of digital audio signals from speech of the second language to translated speech of the first language. The second electronic device 104 translates from the second language to the first language analogously to the translation (414) from the first language to the second language. However in some embodiments, a separate phoneme database may be used for the translation (420) from the second language to the first language. In this case, the phoneme database may be located in the server 116 or in the memory 216.

If the set of digital audio signals are received from the microphone 230 (YES at 410), the second electronic device 104 determines (424) whether a signal amplitude of the set of digital audio signals meets a third threshold. The third threshold indicates whether the set of digital audio signals correspond to speech from the second user 108 (thus in the second language) as opposed to merely being a noise signal. The second threshold may be the same or different from the third threshold, based on design factors (e.g., signal gain) of the microphones 205 and 230. If the third threshold is met (YES at 424), the second electronic device translates (420) from the second language to the first language. If the third threshold is not met (NO at 424), the second electronic device 104 returns to determine (408, 410) whether another set of digital audio signals has been received.

The second electronic device 104 uses predetermined values for the first, second, or third thresholds. However in other embodiments, the second electronic device 104 dynamically selects or adjusts one or more of the first, second, or third thresholds. Using the first, second, and third thresholds, the second electronic device 104 discriminates between the first user 106 and the second user 108, for example, by comparing the gain of a first set of digital audio signals with the gain of a second set of audio signals. The second electronic device 104 designates the set of digital audio signals having the higher gain as being speech of the first language. Conversely, the second electronic device 104 designates the set of digital audio signals having the lower gain as speech of the second language.

Figure 5:
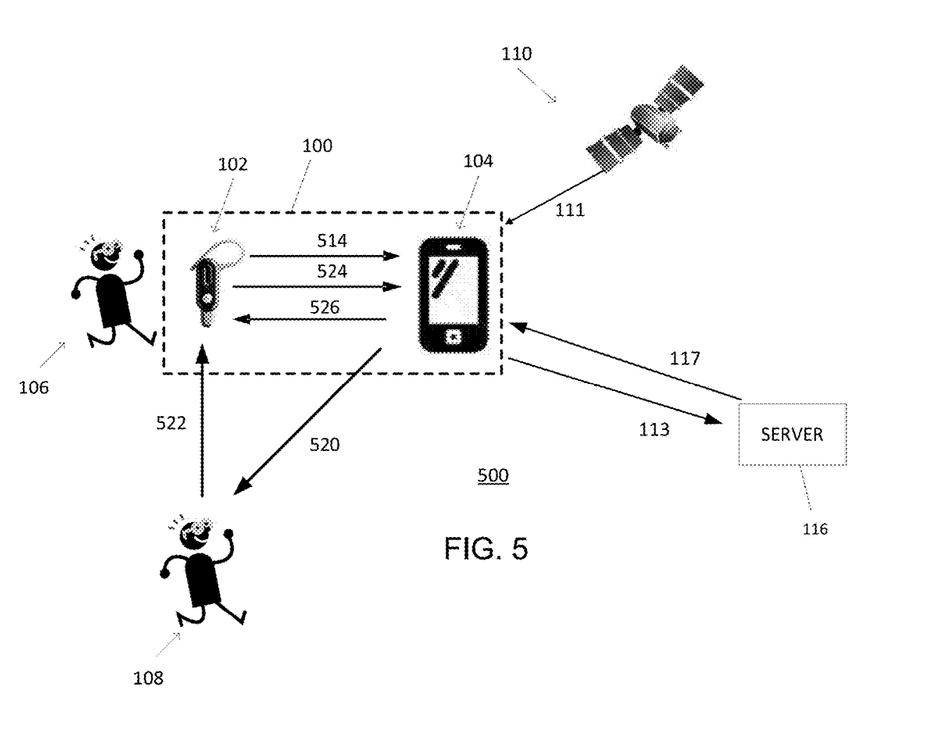
FIG. 5 is a simplified block diagram of the translation system of FIGS. 1 and 2 illustrating first and second users speaking where a microphone of the second electronic device is not used for translation.

Turning to FIG. 5, a simplified diagram 500 shows one implementation of the translation system 100 where the first user 106 speaking and the second user 108 are speaking and the microphone 230 is "off" or otherwise disabled for the translation. In the example shown in FIG. 5, the first electronic device 102 is closer to the first user 106 than to the second speaker 108. For example, the first user 106 may be wearing the first electronic device 102 over their ear (e.g., as a Bluetooth headset). The first user 106 may also hold the second electronic device 104 in their hand, extended out towards the second user 108. As one example, a tourist (e.g., the first user 106) on vacation in Germany may wish to ask a German native (e.g., the second user 108) for directions. The tourist may speak into the first electronic device 102 and also hold the second electronic device 104 in a manner that suggests holding a microphone into which the German native may speak.

In an embodiment of the disclosure, the translation system 100 operates as follows: The first user 106 speaks one or more words of a first language into a microphone 205 of the first electronic device 102. The first electronic device 102 transmits, to the second electronic device 104, a first set of digital audio signals representing the spoken words of the first language (arrow 514). The second electronic device 104 translates the spoken words from speech of the first language to translated speech of the second language. The second electronic device 104 then emits the translated speech of the second language from the loudspeaker 226 (arrow 520).

The second user 108 speaks one or more words of a second language (arrow 522). The microphone 205 of the first electronic device 102 senses the words spoken by the second user 108. The first electronic device 102 transmits, to the second electronic device 104, a second set of digital audio signals representing the spoken words (arrow 524). The second electronic device 104 translates the spoken words from speech of the second language to translated speech of the first language. The second electronic device 104 then transmits, via RF signaling, a third digital audio signal representing the translated speech of the second language (arrow 526). The first electronic device 102 then emits the translated speech of the first language from the audio speaker 210 (e.g., an audio speaker of an earpiece).

Figure 6:
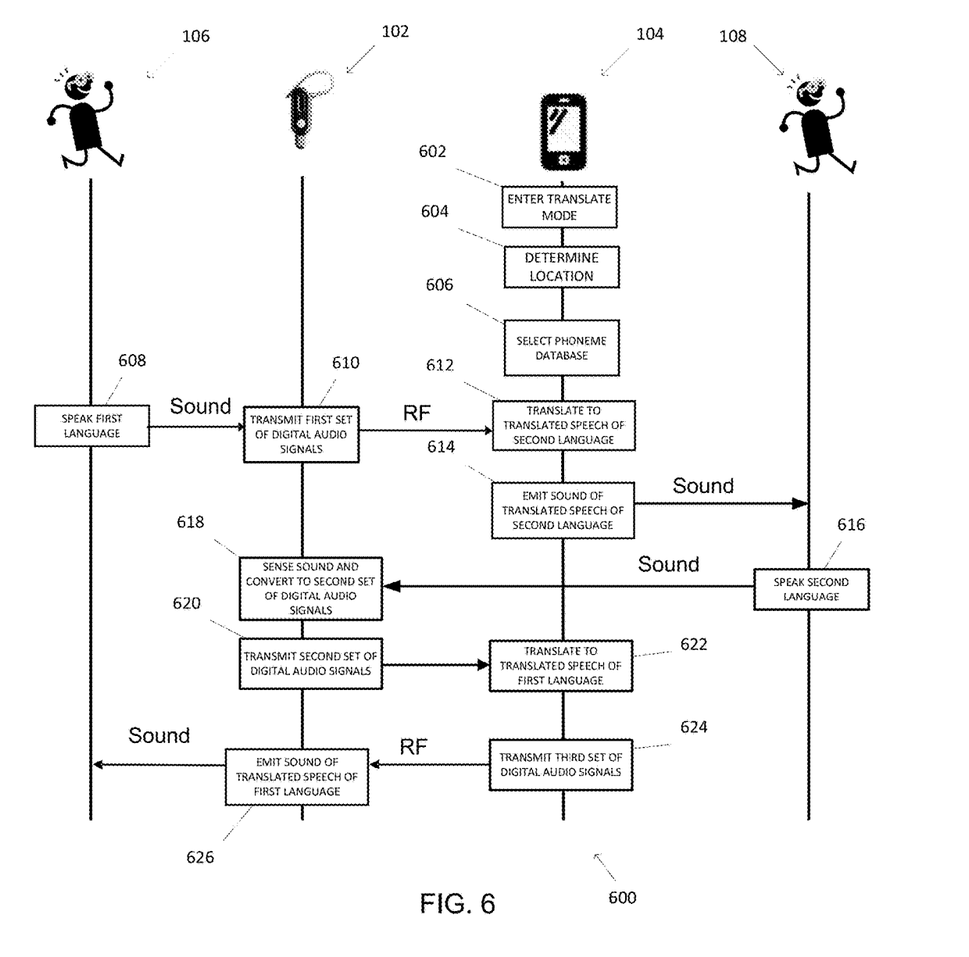
FIG. 6 is a flowchart of a procedure illustrating a translation by the translation system of FIGS. 1, 2, and 5.

Turning to FIG. 6, a procedure 600 illustrates one implementation of a translation by the translation system 100 shown in FIGS. 1, 2, and 5 where the microphone 230 is "off" or otherwise disabled for the translation. The procedure 600 generally corresponds to the flow of digital audio signals and speech shown in FIG. 5, but many variations to the procedure 600 are possible.

Referring again to FIG. 6, the second electronic device 104 enters a translate mode at step 602. The second electronic device 104 enters the translate mode in response to a user input as described in step 402 (FIG. 4). The second electronic device 104 in this case uses its default language as the first language. For example, if the second electronic device 104 is a smartphone, the first language is the language selected by the user when setting up a smartphone. Alternatively, the user 106 can manually select the first language.

At step 604, the second electronic device 104 determines its current geographic location based on data it receives in a signal, such as a satellite signal, a WLAN signal, or a cellular network signal, as described above with reference to step 404 (FIG. 4). At step 606, the second electronic device 104 selects a phoneme database based on the identity of the first language and the identity of the second language. One way the second electronic device can determine the identity of the first and second languages is to use geographic location information to identify the country in which the second electronic device 104 is located. For example, if the geographic location information indicates that the electronic device 104 is currently in France, then the electronic device 104 retrieves the French phoneme database. In other implementations, the second electronic device 104 selects the phoneme database based on first and second languages as described in step 406.

The second electronic device 104 can also determine a dialect based on the country or region in which the second electronic device 104 is located, as described above. For example, if the second electronic device 104 identifies the country in which it is located as Mexico, then the determined dialect would be Mexican Spanish (as opposed to the Spanish spoken in Spain). The second electronic device 104 would then select the Mexican-Spanish phoneme database.

The second electronic device 104 can retrieve this database from the memory 216 (FIG. 2) or from an online translation service provided by the servers 116 (FIG. 1). The second electronic device 104 can retrieve the database either real-time (while it is in the translation mode) or prior to entering the translation mode. Alternatively, the second electronic device 104 may use a remote phoneme database (e.g., provided on the server 116) by sending a message to the server 116, as described above.

At step 608, the first user 106 speaks one or more words of the first language. At step 610, the RF module 206 (FIG. 2) transmits the first set of digital audio signals via RF signaling to the RF module 218 (FIG. 2) of the second electronic device 104. The RF module 218 (FIG. 2) provides the first set of digital audio signals to the processor 214 (FIG. 2). At step 612, the processor 214 (FIG. 2) translates the first set of digital audio signals from speech of the first language to translated speech of the second language, for example, as described above in step 414 (FIG. 4).

At step 614, the loudspeaker 226 (FIG. 2) of the second electronic device 104 emits the sound of the translated speech of the second language.

At step 616, the second user 108 speaks one or more words of the second language. At step 618, the microphone 205 (FIG. 2) of the first electronic device 102 senses the sound and converts the sound into a second set of digital audio signals, which represent the spoken words of the second language. At step 620, the RF module 206 (FIG. 2) of the first electronic device 102 transmits the second set of digital audio signals via RF signaling to the RF module 218 (FIG. 2) of the second electronic device 104.

At step 622, the processor 214 (FIG. 2) translates the second set of digital audio signals from speech of the second language to translated speech of the first language. At step 624, the RF module 218 (FIG. 2) of the second electronic device 104 transmits a third set of digital audio signals representing the translated speech of the first language via RF signaling to the RF module 206 (FIG. 2) of the first electronic device 102. At step 626, the audio speaker 210 (FIG. 2) of the first electronic device 104 emits the sound of the translated speech of the first language for the second user 106 to hear.

While the steps of FIG. 6 are generally shown within a short time period of each other, various steps may be performed at later times. For example, the user 106 may activate (602) the translate mode at a first time, such as when the user leaves a hotel in the morning but not speak (608) until they reach another destination, such as a restaurant. In other examples, delays may be introduced due to the time taken to send a message to the server 116 for translations to occur (e.g., due to poor transfer speeds) or time taken to translate the digital audio signals by the processor 214.

Figure 7:
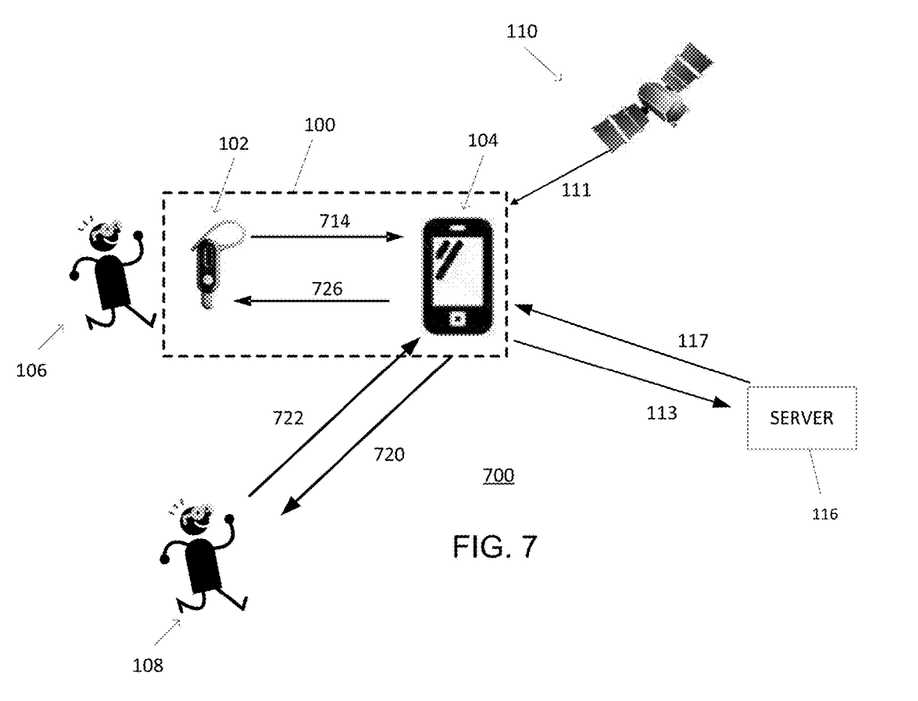
FIG. 7 is another simplified block diagram of the translation system of FIGS. 1 and 2 illustrating first and second users speaking where the microphone of the second electronic device is used for translation.

Turning to FIG. 7, a diagram 700 shows how the translation system 100 operates in another embodiment of the disclosure where the microphone 230 is "on" for the translation. FIG. 7 shows the first user 106 and the second user 108. The first electronic device 102 is closer to the first user 106 than to the second user 108. In this case, the microphone 205 of the first electronic device 102 is generally used by the first user 106 while the microphone 230 of the second electronic device 104 is generally used by the second user 108. Accordingly, the second electronic device 104 may discriminate between the first and second users based on an audio path from which the set of digital audio signals are received. In one example, the second electronic device 104 performs translations of speech from the first user 106 in parallel with translations of speech from the second user 108 by using both microphone 205 and 230 simultaneously. The first user 106 speaks one or more words of a first language into a microphone 205 of the first electronic device 102. The first electronic device 102 transmits, to the second electronic device, a first set of digital audio signals representing the spoken words of the first language (arrow 714). The second electronic device 104 translates the spoken words from speech of the first language to translated speech of the second language. The second electronic device 104 then emits the translated speech of the second language from the loudspeaker 226 (arrow 720).

The second user 108 speaks one or more words of a second language (arrow 722). The microphone 230 of the second electronic device 104 senses the words spoken by the second user 108. The microphone 230 converts the sensed words to a second set of digital audio signals representing the spoken words. The second electronic device 104 translates the spoken words from speech of the second language to translated speech of the first language. The second electronic device 104 then transmits, via RF signaling, a third digital audio signal representing the translated speech of the second language (arrow 726). The first electronic device 102 then emits the translated speech of the first language from the audio speaker 210 for the first user 106 to hear.

Figure 8:
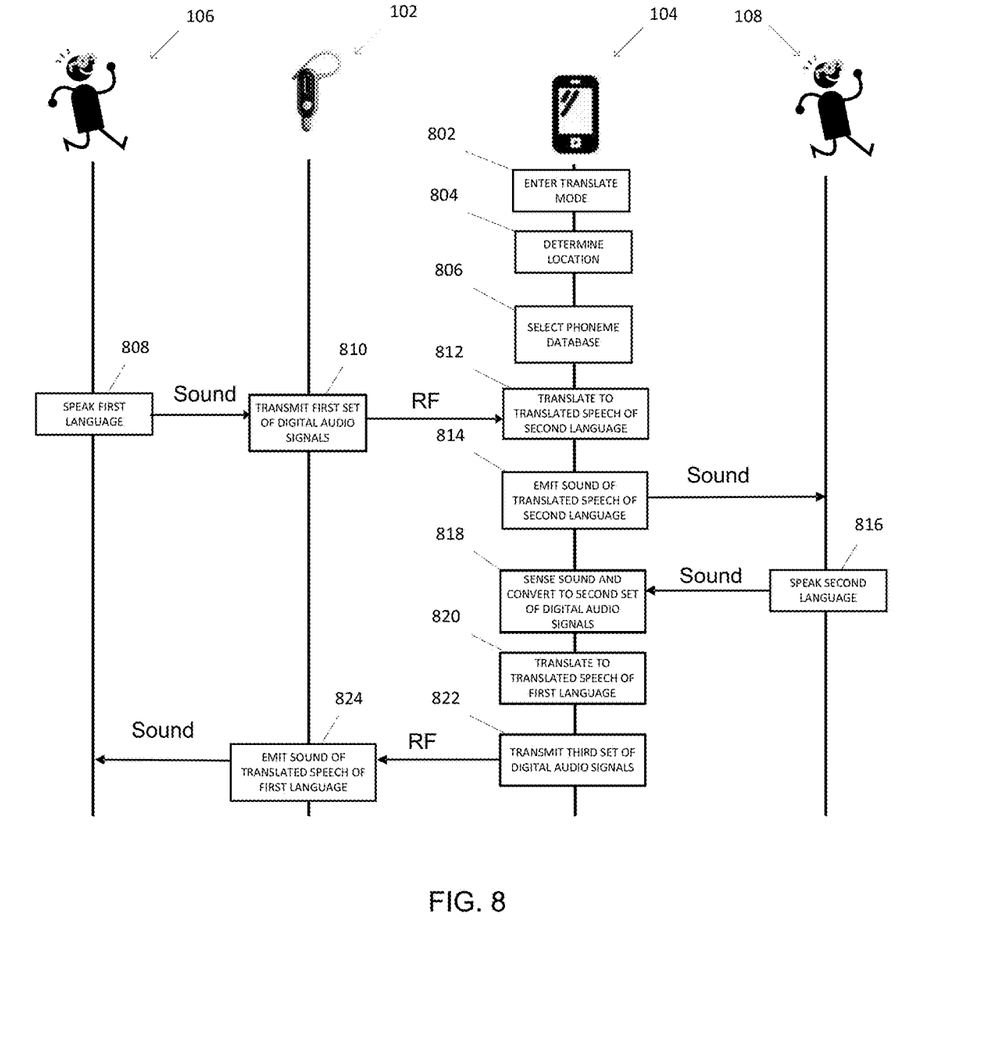
FIG. 8 is a flowchart of another procedure illustrating a translation by the translation system of FIGS. 1, 2, and 7.

FIG. 8 shows a procedure 800 that the translation system 100 (FIG. 1) carries out according to an embodiment of the disclosure. This procedure generally corresponds to the flow of digital audio signals and speech shown in FIG. 7. Many variations to the procedure 800 are possible, however.

Referring again to FIG. 8, steps 802, 804, and 806 are performed in the same manner as steps 602, 604, and 606 of FIG. 6.

At step 808, the first user 106 speaks one or more words of the first language. At step 810, the RF module 206 (FIG. 2) of the first electronic device 104 transmits the first set of digital audio signals via RF signaling to the RF module 218 (FIG. 2) of the second electronic device 104. At step 812, the processor 214 (FIG. 2) receives the first set of digital audio signals from the RF module 218 (FIG. 2) and translates the first set of digital audio signals from speech of the first language to translated speech of the second language. At step 814, the audio loudspeaker 226 (FIG. 2 of the second electronic device 104 emits the sound of the translated speech of the second language for hearing by the first user 106.

At step 816, the second user 108 speaks one or more words presumably of the second language. At step 818, the microphone 230 (FIG. 2) senses the sound and converts the sound into a second set of digital audio signals, which represent the spoken words of the second user. At step 820, the processor 214 (FIG. 2) translates the second set of digital audio signals from speech of the second language to translated speech of the first language. At step 822, the RF module 218 (FIG. 2) of the second electronic device 104 transmits a third set of digital audio representing the translated speech of the first language via RF signaling to the RF module 206 (FIG. 2) of the first electronic device 102. At step 824, the audio speaker 210 of the first electronic device 102 emits the sound of the translated speech of the first language for the first user 106 to hear.

It can be seen from the foregoing that a method and system for translating speech has been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The invention claimed is:
1. A computer-implemented method, comprising:
  receiving, at a computing device having one or more processors, a first set of digital audio signals;

comparing, at the computing device, a signal amplitude of the first set of digital audio signals to a first threshold;
when the signal amplitude of the first set of digital audio signals exceeds the first threshold:
obtaining, at the computing device, a first translation of the first set of digital audio signals from speech of a first language into translated speech of a second language, and
outputting, at the computing device, the first translation; and
when the signal amplitude of the first set of digital audio signals does not exceed the first threshold,
comparing the signal amplitude of the first set of digital audio signals to a second threshold, and
when the signal amplitude of the first set of digital audio signals exceeds the second threshold:
obtaining, at the computing device, a second translation of the first set of digital audio signals from speech of the second language into translated speech of the first language, and
outputting, at the computing device, the second translation.

2. The computer-implemented method of claim 1, wherein outputting the first translation comprises outputting an audio output representative of the first translation via a speaker of the computing device.

3. The computer-implemented method of claim 2, wherein outputting the second translation comprises transmitting a second set of digital audio signals representing the second translation to another electronic device via radio frequency signaling, wherein the second set of digital audio signals are output via a speaker of the other electronic device.

4. The computer-implemented method of claim 1, wherein, when the signal amplitude of the first set of digital audio signals does not exceed the first threshold, the first set of digital audio signals is determined to comprise speech when the signal amplitude of the first set of digital audio signals exceeds the second threshold, and the first set of digital audio signals is determined to not comprise speech when the signal amplitude of the first set of digital audio signals does not exceed the second threshold.

5. The computer-implemented method of claim 1, wherein:
obtaining the first translation comprises receiving the first translation from an online translation service, and
obtaining the second translation comprises receiving the second translation from the online translation service.

6. The computer-implemented method of claim 1, further comprising selecting, at the computing device, the first language based upon a default language setting of the electronic device.

7. The computer-implemented method of claim 1, further comprising selecting, at the computing device, the second language based upon a geographic location of the computing device.

8. The computer-implemented method of claim 1, wherein receiving the first set of digital audio signals comprises receiving the first set of digital audio signals from another electronic device via radio frequency signaling.

9. The computer-implemented method of claim 8, further comprising:
receiving, at the computing device, a second set of digital audio signals from a microphone associated with the computing device;
obtaining, at the computing device, a third translation of the second set of digital audio signals from speech of the second language into translated speech of the first language; and
outputting, at the computing device, the third translation by transmitting a third set of digital audio signals representing the third translation to the other electronic device via radio frequency signaling, wherein the third set of digital audio signals are output via a speaker of the other electronic device.

10. The computer-implemented method of claim 1, wherein receiving the first set of digital audio signals comprises receiving the first set of digital audio signals from a microphone associated with the computing device.

11. A computing device, comprising:
one or more processors; and
a non-transitory computer-readable storage medium having a plurality of instructions stored thereon, which, when executed by the one or more processors, cause the one or more processors to perform operations comprising:
receiving a first set of digital audio signals;
comparing a signal amplitude of the first set of digital audio signals to a first threshold;
when the signal amplitude of the first set of digital audio signals exceeds the first threshold:
obtaining a first translation of the first set of digital audio signals from speech of a first language into translated speech of a second language, and
outputting the first translation; and
when the signal amplitude of the first set of digital audio signals does not exceed the first threshold:
comparing the signal amplitude of the first set of digital audio signals to a second threshold, and
when the signal amplitude of the first set of digital audio signals exceeds the second threshold:
obtaining a second translation of the first set of digital audio signals from speech of the second language into translated speech of the first language when the first set of digital audio signals, and
outputting the second translation.

12. The computing device of claim 11, wherein outputting the first translation comprises outputting an audio output representative of the first translation via a speaker of the computing device.

13. The computing device of claim 12, wherein outputting the second translation comprises transmitting a second set of digital audio signals representing the second translation to another electronic device via radio frequency signaling, wherein the second set of digital audio signals are output via a speaker of the other electronic device.

14. The computing device of claim 11, wherein, when the signal amplitude of the first set of digital audio signals does not exceed the first threshold, the first set of digital audio signals is determined to comprise speech when the signal amplitude of the first set of digital audio signals exceeds the second threshold, and the first set of digital audio signals is determined to not comprise speech when the signal amplitude of the first set of digital audio signals does not exceed the second threshold.

15. The computing device of claim 11, wherein:
obtaining the first translation comprises receiving the first translation from an online translation service, and
obtaining the second translation comprises receiving the second translation from the online translation service.

16. The computing device of claim 11, wherein the operations further comprise selecting the first language based upon a default language setting of the electronic device.

17. The computing device of claim 11, wherein the operations further comprise selecting the second language based upon a geographic location of the computing device.

18. The computing device of claim 11, wherein receiving the first set of digital audio signals comprises receiving the first set of digital audio signals from another electronic device via radio frequency signaling.

19. The computing device of claim 11, wherein the operations further comprise:
   receiving a second set of digital audio signals from a microphone associated with the computing device;
   obtaining a third translation of the second set of digital audio signals from speech of the second language into translated speech of the first language; and
   outputting the third translation by transmitting a third set of digital audio signals representing the third translation to the other electronic device via radio frequency signaling, wherein the third set of digital audio signals are output via a speaker of the other electronic device.

20. The computing device of claim 11, wherein receiving the first set of digital audio signals comprises receiving the first set of digital audio signals from a microphone associated with the computing device.

* * * * *